(12) United States Patent
Nakaya et al.

(10) Patent No.: US 11,465,230 B2
(45) Date of Patent: Oct. 11, 2022

(54) MACHINE TOOL

(71) Applicants: CITIZEN WATCH CO., LTD., Nishitokyo (JP); CITIZEN MACHINERY CO., LTD., Nagano (JP)

(72) Inventors: Takaichi Nakaya, Higashimurayama (JP); Ai Kikuchi, Saku (JP)

(73) Assignees: CITIZEN WATCH CO., LTD., Nishitokyo (JP); CITIZEN MACHINERY CO., LTD., Nagano (JP)

( * ) Notice: Subject to any disclaimer, the term of this patent is extended or adjusted under 35 U.S.C. 154(b) by 2 days.

(21) Appl. No.: 17/259,928

(22) PCT Filed: Jul. 16, 2019

(86) PCT No.: PCT/JP2019/027975
§ 371 (c)(1),
(2) Date: Jan. 13, 2021

(87) PCT Pub. No.: WO2020/017514
PCT Pub. Date: Jan. 23, 2020

(65) Prior Publication Data
US 2021/0291294 A1    Sep. 23, 2021

(30) Foreign Application Priority Data

Jul. 18, 2018    (JP) .............................. JP2018-135216

(51) Int. Cl.
*B23K 20/00*    (2006.01)
*B23K 20/12*    (2006.01)

(52) U.S. Cl.
CPC ................................. *B23K 20/121* (2013.01)

(58) Field of Classification Search
CPC .. B23K 20/121; B23K 20/123; B23K 20/125; B23K 20/126; B23K 20/22
See application file for complete search history.

(56) References Cited

U.S. PATENT DOCUMENTS

| | | | |
|---|---|---|---|
| 4,998,663 A * | 3/1991 | Cakmak | B23K 20/12 228/103 |
| 7,651,019 B2 * | 1/2010 | Kyriakoglou | B23K 20/12 228/2.1 |

(Continued)

FOREIGN PATENT DOCUMENTS

| | | |
|---|---|---|
| CN | 1135147 C | 1/2004 |
| CN | 101961816 A | 2/2011 |

(Continued)

OTHER PUBLICATIONS

Oct. 15, 2019, International Search Report issued in the International Patent Application No. PCT/JP2019/027975.

(Continued)

*Primary Examiner* — Erin B Saad
(74) *Attorney, Agent, or Firm* — Kenja IP Law PC

(57) ABSTRACT

A machine tool includes a first main shaft, a first drive source for moving the first main shaft, a second main shaft, a second drive source for moving the second main shaft, and a control means for carrying out a control so as to bring the workpiece held by the first main shaft and the workpiece held by the second main shaft into contact with each other while rotating them relative to each other, thereby to carry out the friction-heating, and to stop the relative rotation of the pair of workpieces and move only the second main shaft in the axial direction while holding the first main shaft stationary, thereby to carry out friction-welding of the pair of workpieces. The control means controls the operation of the first drive source upon the friction-welding of the pair of (Continued)

workpieces, so as to maintain the axial position of the first main shaft.

7 Claims, 3 Drawing Sheets

(56) References Cited

U.S. PATENT DOCUMENTS

| | | | |
|---|---|---|---|
| 10,646,953 B2* | 5/2020 | Büchler | B23K 20/12 |
| 2006/0043155 A1* | 3/2006 | Lovin | B23K 20/121 |
| | | | 228/102 |
| 2012/0012643 A1* | 1/2012 | Beech | B29C 66/961 |
| | | | 228/102 |
| 2012/0012644 A1* | 1/2012 | Baxter | B23K 20/121 |
| | | | 228/2.1 |
| 2015/0298249 A1* | 10/2015 | Büchler | B29C 65/06 |
| | | | 228/104 |
| 2017/0326667 A1* | 11/2017 | Büchler | B23K 9/08 |
| 2019/0168335 A1* | 6/2019 | Onose | B23K 20/24 |

FOREIGN PATENT DOCUMENTS

| | | |
|---|---|---|
| CN | 102794559 A | 11/2012 |
| CN | 107249808 A | 10/2017 |
| JP | H01107986 A | 4/1989 |
| JP | H08206926 A | 8/1996 |
| JP | H1147958 A | 2/1999 |
| JP | 2000071082 A | 3/2000 |
| JP | 2011025281 A | 2/2011 |
| KR | 1020110010561 A | 2/2011 |

OTHER PUBLICATIONS

Jan. 19, 2021, International Preliminary Report on Patentability issued in the International Patent Application No. PCT/JP2019/027975.

Feb. 23, 2022, Office Action issued by the China National Intellectual Property Administration in the corresponding Chinese Patent Application No. 201980046398.3.

Aug. 19, 2022, Office Action issued by the Taiwan Intellectual Property Office in the corresponding Taiwanese Patent Application No. 108125456.

* cited by examiner

MACHINE TOOL

TECHNICAL FIELD

This disclosure relates to a machine tool capable of friction-welding a pair of workpieces.

BACKGROUND

Conventionally, there is known a machine tool capable of friction-welding a pair of workpieces, including a pair of spindles for holding respective workpieces and a pair of drive sources for moving the respective spindles in the axial direction, wherein the workpieces held by the respective spindles are brought into contact with each other while being relatively rotated so as to frictionally heat the pair of workpieces, and then the relative rotation is stopped to carry out the friction-welding (refer, for example, to JPH 08-206926 A (PTL 1)).

CITATION LIST

Patent Literature

PTL 1: JPH 08-206926 A

SUMMARY

Technical Problem

There is known a machine tool wherein both of the above-mentioned conventional spindles are provided as being movable in the axial direction, though it is often difficult to smoothly carry out the friction-welding by means of the above-mentioned machine tool.

The present disclosure has been made in view of the above-mentioned problem, and it is an object of the present disclosure to provide a machine tool capable of smoothly friction-welding a pair of workpieces.

Solution to Problem

According to the present disclosure, there is provided a machine tool comprising a first spindle for holding a workpiece, a first drive source for moving the first spindle in an axial direction, a second spindle for holding a workpiece, a second drive source for moving the second spindle in the axial direction, and a control means for controlling the rotation of the first spindle, the rotation of the second spindle and the operation of the second drive source, so as to bring the workpiece held by the first main shaft and the workpiece held by the second main shaft into contact with each other while rotating them relative to each other, thereby to carry out the friction-heating, and to stop the relative rotation of the pair of workpieces and move only the second main shaft in the axial direction while holding the first main shaft stationary, thereby to carry out friction-welding of the pair of workpieces, characterized in that the control means is adapted to control the operation of the first drive source so as to maintain the axial position of the first spindle upon friction-welding of the pair of the workpieces.

Preferably, in the machine tool of the present disclosure with the above-mentioned configuration, the inertia of a members driven by the first drive source and moving in the axial direction together with the first spindle, as a whole, is larger than the inertia of a members driven by the second drive source and moving in the axial direction together with the second spindle, as a whole.

Preferably, in the machine tool of the present disclosure with the above-mentioned configuration, the first drive source is an electric motor, and the machine tool further comprises torque detecting means for detecting the torque applied to the first drive source, and wherein the control means is adapted to control the operation of the first drive source upon the friction-welding of the pair of workpieces, so as to resist the torque detected by the torque detecting means.

Preferably, in the machine tool of the present disclosure with the above-mentioned configuration, the machine tool comprises a tool that can be moved under the control by the control means, and the control means is adapted to control the rotation of the first spindle, the rotation of the second spindle and the relative movement of the tool so that, after the pair of workpieces have been friction-welded, the first spindle and the second spindle are rotated in the same direction at the same rotation speed, while the tool is moved relative to the workpieces, thereby to carry out cutting process for cutting the workpiece by means of the tool.

Preferably, in the machine tool of the present disclosure with the above-mentioned configuration, the control means is adapted to control the operation of the second drive source so that, after stopping the relative rotation of the pair of the workpieces and while maintaining the first spindle stationary. only the second spindle is moved to an axial position predetermined in consideration of an upset distance.

Advantageous Effect

The present disclosure thus provides a machined tool wherein, when friction-welding is carried out, one of the spindles is moved while the other of the spindles is maintained stationary to carry out the friction-welding, thereby allowing the friction-welding to be carried out smoothly, even when both spindles are movable in the axial direction.

DETAILED DESCRIPTION

Figure 1:
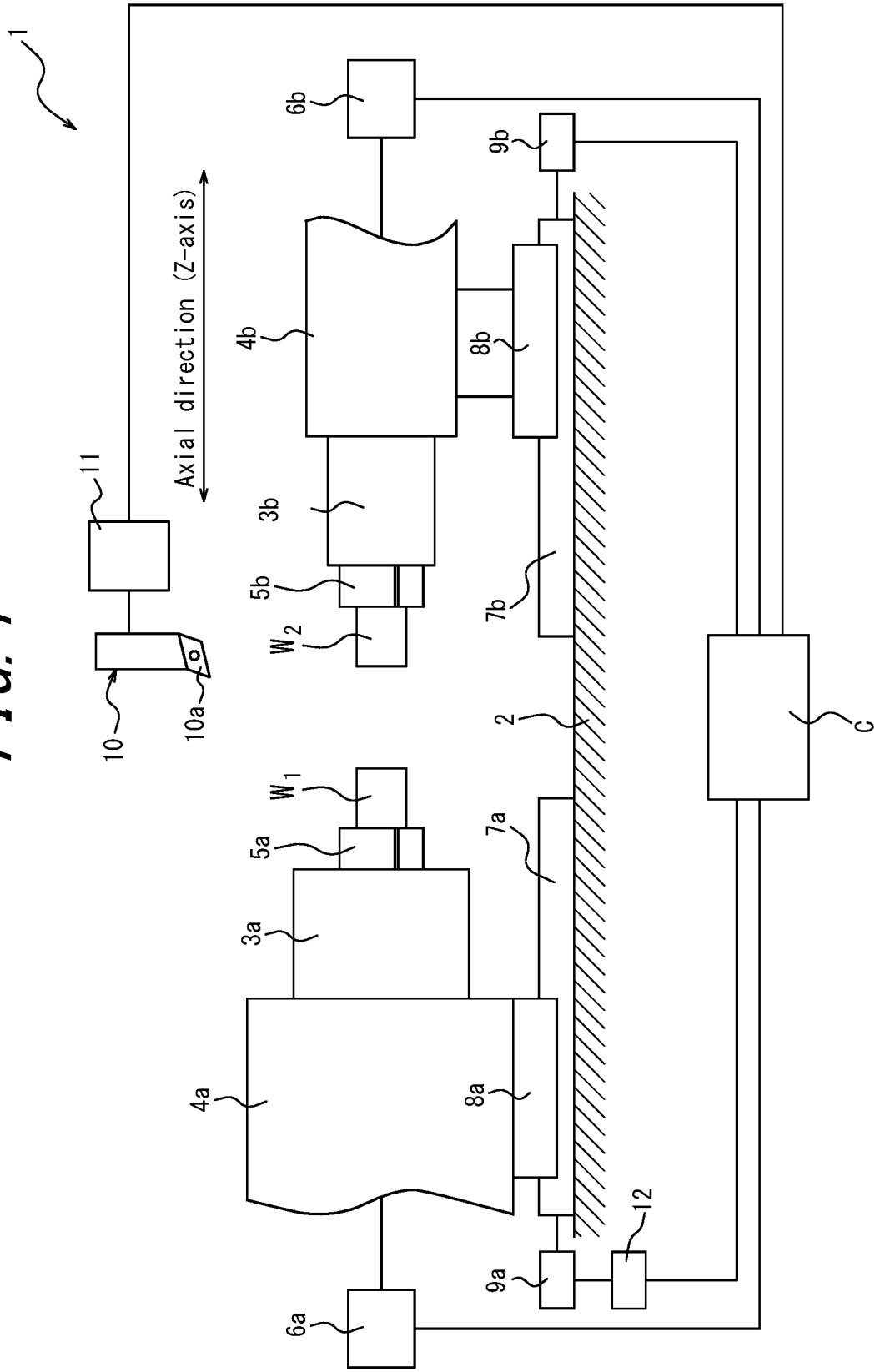
FIG. 1 is an explanatory view schematically illustrating the configuration of the machine tool according to one embodiment of the present disclosure.

The machine tool 1 illustrated in FIG. 1 is provided with a function of joining a first workpiece W1 and a second workpiece W2 by friction-welding, and a function of cutting (turning) the joined workpiece W3 consisting of the friction-welded first and the second workpieces W1 and W2. The machine tool 1 may be configured by adding a friction-welding function to a lathe, such as a CNC lathe.

The machine tool 1 has two spindles arranged on a base 2, i.e., a first spindle 3a and a second spindle 3b. The first spindle 3a is rotatably supported by a first headstock 4a, and the second spindle 3b is rotatably supported by a second headstock 4b. The first spindle 3a and the second spindle 3b are arranged coaxially and face each other with a predetermined interval.

The first spindle 3a is provided with a first clamp 5a at its tip, so that the first workpiece W1 can be held by the first clamp 5a. The second spindle 3b is provided with a second clamp 5b at its tip, so that the second workpiece W2 can be held by the second clamp 5b.

The first spindle 3a is adapted to be rotationally driven by a first electric motor 6a. By rotationally driving the first spindle 3a with the first electric motor 6a, the first workpiece W1 held by the first spindle 3a can be rotated. The second spindle 3b is adapted to be rotationally driven by a second electric motor 6b. By rotationally driving the second spindle 3b with the second electric motor 6b, the second workpiece W2 held by the second spindle 3b can be rotated.

A first guide rail 7a extending in the axial direction (Z-axis direction) of the first spindle 3a is fixedly secured to the base 2. A first saddle 8a fixedly secured to the first headstock 4a is slidably attached to the first guide rail 7a. A ball screw mechanism (not shown) is provided between the first guide rail 7a and the first saddle 8a. The ball screw mechanism is adapted to be rotationally driven by the first drive source 9a for rotating and driving the ball screw mechanism to move the first headstock 4a in the axial direction (Z-axis direction) together with the and the first spindle 3a.

A second guide rail 7b extending in the axial direction (Z-axis direction) of the second spindle 3b is fixedly secured to the base 2. A second saddle 8b fixedly secured to the second spindle 4b is slidably attached to the second guide rail 7b. A ball screw mechanism (not shown) is provided between the second guide rail 7b and the second saddle 8b. The ball screw mechanism is adapted to be rotationally driven by the second drive source 9b for rotating and driving the ball screw mechanism to move the second spindle 3b in the axial direction (Z-axis direction) together with the second spindle 4b.

In the present embodiment, servomotors (electric motors) are used as the first drive source 9a and the second drive source 9b, respectively.

In the present embodiment, the first spindle 3a is the front spindle, and the second spindle 3b is the rear spindle. The outer diameter of the first spindle 3a, i.e., the front spindle, is larger than the outer diameter of the second spindle 3b, i.e., the rear spindle. The weight of the first spindle 3a is heavier than the weight of the second spindle 3b. Further, the inertia of the members driven by a first drive source 9a and moved in the axial direction together with a first spindle 3a, including the first spindle 4a, the first clamp 5a, the first electric motor 6a, the first saddle 8a, and the ball screw mechanism, etc., representing the difficulty for moving the indicated members as a whole, is set to be larger than the inertia of the members of the members driven by the second drive source 9b and moved in the axial direction together with the second spindle 3b, including the second headstock 4b, the second clamp 5b, the second electric motor 6b, the second saddle 8b and the ball screw mechanism, etc., representing the difficulty for moving the indicated members as a whole.

The machine tool 1 includes a tool 10 for cutting process. The tool 10 is mounted on the moving means 11 and adapted to be driven by the moving means 11 to move at least in the cutting direction (X-axis direction) and the feeding direction (Z-axis direction). By pressing the blade portion 10a of the tool 10 against the first workpiece W1, the second workpiece W2 or the joining workpiece W3 in a state of being rotated at a machining rotation speed corresponding to the cutting process, it is possible to subject the first workpiece W1, the second workpiece W2 or the joined workpiece W3 to machining by means of the tool 10.

The machine tool 1 has a control unit C as the control means. The control unit C may be configured, for example, by a microcomputer provided with storage means, such as a CPU (Central Processing Unit) and a memory. The control unit C is connected to the first electric motor 6a, the second electric motor 6b, the first drive source 9a, the second drive source 9b and the moving means 11.

An ammeter 12 is connected to the first drive source 9a. The control unit C has a function as a torque detecting means and is adapted to detect the torque applied to the first driving source 9a, based on the current value of the first driving source 9a as detected by the ammeter 12.

In the machine tool 1, the control unit C serves to integrally control the rotation of the first spindle 3a and the second spindle 3b and the operation of the first drive source 9a and the second drive source 9b, that is, the movement in the axial direction of the first spindle 3a and the second spindle 3b, to thereby bring the first workpiece W1 held by the first spindle 3a and the second workpiece W2 held by the second spindle 3b into friction-welding with each other. The procedures for friction-welding the first workpiece W1 and the second workpiece W2 by means of the machine tool 1 will be described below.

Figure 2A:
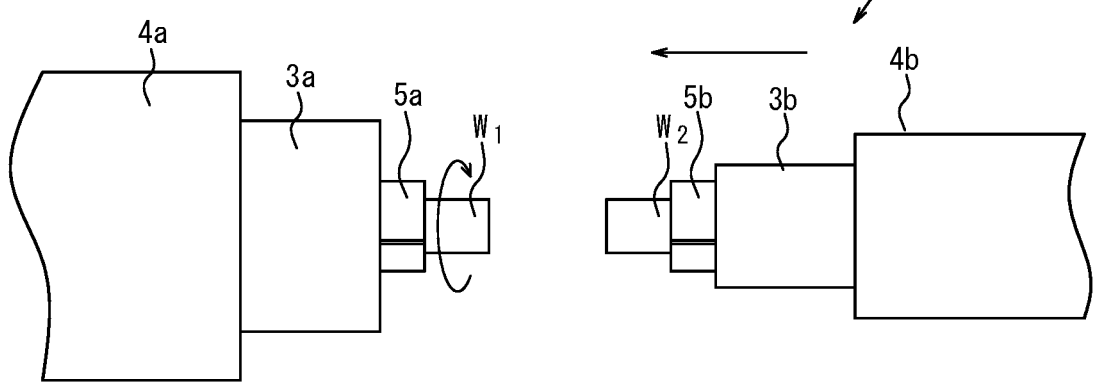
FIGS. 2A to 2C are explanatory views illustrating the procedure of friction-welding of two workpieces.

First, as illustrated in FIG. 2A, the first spindle 3a is made to hold the first workpiece W1 by using the first clamp 5a, and the second spindle 3b is made to hold the second workpiece W2 by using the second clamp 5b. As the first workpiece W1 and the second workpiece W2, for example, a round bar made of steel may be used, though the workpiece may be made of other metal materials, and the workpiece having various shapes may also be used.

Next, the first spindle 3a is rotated at a predetermined rotation speed while the rotation of the second spindle 3b is maintained stationary, so that the first workpiece W1 held by the first spindle 3a and the second workpieces W2 held by the second spindle 3b are rotated relative to each other with a predetermined rotation speed difference.

It should be noted that only the second spindle 3b may be rotated at a predetermined rotation speed while the rotation of the first spindle 3a is stopped so as to rotated the first workpiece W1 and the second workpiece W2 relative to each other. Alternatively, the first spindle 3a and the second spindle 3b may be rotated in the same direction at different rotation speeds so as to rotate the first spindle W1 and the second workpiece W2 relative to each other. Further alternatively, the first spindle 3a and the second spindle 3b may be rotated in opposite directions at a rotation speed or the same rotation speed so as to rotate the first workpiece W1 and the second workpiece W2 relative to each other.

Figure 2B:
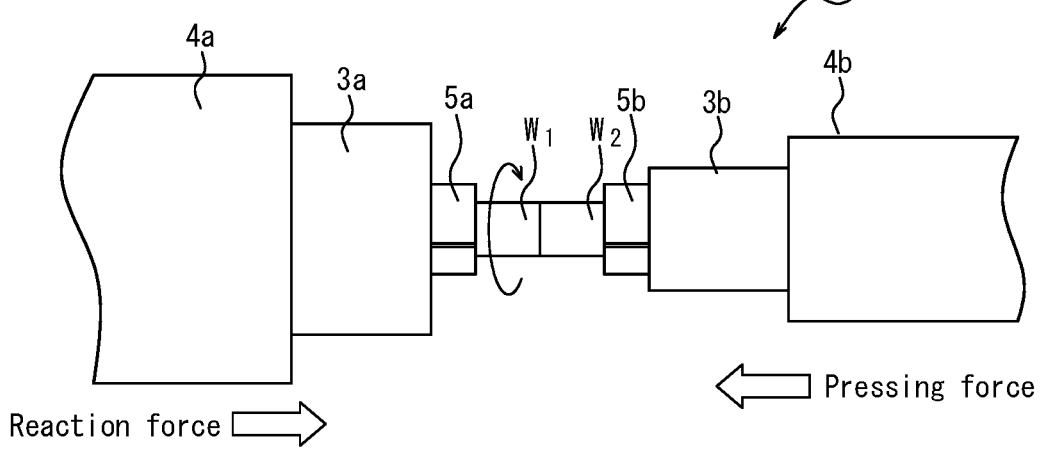

Next, in a state where the first workpiece W1 held by the first spindle 3a and the second workpiece W2 held by the second spindle 3b are rotated relative to each other with a predetermined rotation speed difference, and where the first spindle 3a is maintained stationary without moving in the direction, the second drive source 9b is operated to move the second spindle 3b in the axial direction toward the first spindle 3a and bring the axial end face of the first workpiece W1 into contact with the axial end face of the second workpiece W2, as illustrated in FIG. 2B. When the axial end face of the first workpiece W1 comes into contact with the axial end face of the second workpiece W2, due to the relative rotation between the first workpiece W1 and the second workpiece W2 at the predetermined rotation speed difference, friction heat is generated between the axial end faces of the first workpiece W1 and the second workpiece W2 to frictionally heat the first workpiece W1 and the second workpiece W2.

The difference in rotation speed between the first workpiece W1 and the second workpiece W2 that rotate relative to each other may be a difference in rotation speed that can generate a frictional heat required for frictional welding between the first workpiece W1 and the second workpiece W2.

Figure 2C:
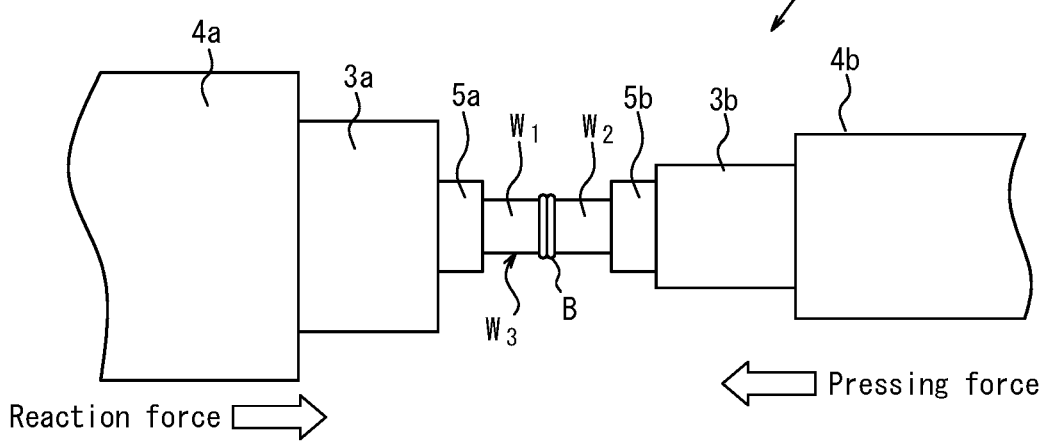

When the axial end faces of the first workpiece W1 and the second workpiece W2 reach a predetermined temperature due to the frictional heating, as illustrated in FIG. 2C, the rotation of the first spindle 3a is stopped to stop the relative rotation between the first workpiece W1 and the second workpiece W2, and the first spindle 3a is maintained stationary without moving in the axial direction. Then, the second drive source 9b is operated to move only the second spindle 3b in the axial direction further toward the main shaft 3a. As a result, the axial end face of the second workpiece W2 is pressed against the axial end face of the first workpiece W1 at a predetermined pressure (upset pressure) in the axial direction, to achieve a friction-welding between the first workpiece W1 and the second workpiece W2 with their axial end surfaces as a joint surface.

When the axial end face of the second workpiece W2 is pressed against the axial end face of the first workpiece W1 at a predetermined pressure in the direction along the axial direction, the amount of movement of the second spindle 3b in the axial direction is determined in advance, in consideration of an upset distance (the length of the parts of the first workpiece W1 and the second workpiece W2 extruded as burrs and shortened by the joining), and the movement of the second spindle 3b is controlled so that it moves in the axial direction to a position that takes the above-mentioned movement amount into consideration. Specifically, the movement of the second spindle 3b is controlled so as to reach an axial position where the axial end surface of the second workpiece W2 before joining assumes an axial position that is closer to the first spindle 3a than the axial position where the joining surface between the first workpiece W1 and the second workpiece W2 is formed.

In the machine tool 1 according to the present embodiment, when the first workpiece W1 held by the first spindle 3a and the second workpiece W2 held by the second spindle 3b are frictionally welded to each other, in order to prevent the first spindle 3a from being pushed and moved in the axial direction by the axially moving second spindle 3b, the control unit C is adapted to control the operation of the first drive source 9a so as to hold the axial position of the first spindle 3a. That is, the control unit C serves to control operation of the first drive source 9a when the first workpiece W1 held by the first spindle 3a and the second workpiece W2 held by the second spindle 3b are frictionally welded to each other, so as not only to hold the first drive source 9a in a stopped state, but also to generate a reaction force for the first spindle 3a capable of resisting the pressing force applied from the second spindle 3b to the first spindle 3a, thereby maintaining the first spindle 3a stationary, without being moved in the axial direction. For example, the control unit C is configured to detect the torque applied to the first drive source 9a as the first spindle 3a is pushed by the second spindle 3b, based on the current value of the first drive source 9a as detected by the ammeter 12, and to control the driving power supplied to the first driving source 9a so that the first driving source 9a generates the driving force against the torque.

In the machine tool 1 according to the present embodiment, as described above, the control unit C is configured to control the operation of the first drive source 9a when the first workpiece W1 held by the first spindle 3a and the second workpiece W2 held by the second spindle 3b are friction-welded to each other, so as to maintain the axial position of the first spindle 3a when the second workpiece W2 is pressed against the first workpiece W1 upon friction-welding, even if the first spindle 3a is pushed by the axially moving second spindle 3b, is possible to maintain the first spindle 3a stationary. By this, when the second workpiece W2 is pressed against the first workpiece W1, the pressing force required for the friction-welding can be obtained, thereby allowing the first workpiece W1 and the second workpiece W2 to be smoothly friction-welded.

In particular, if the inertia of the members driven by the first drive source 9a and moved in the axial direction together with the first spindle 3a, as a whole, is made larger than the inertia of the members driven by the second drive source 9b and moved in the axial direction together with the second spindle 3b, it becomes possible to easily maintain the first spindle 3a stationary as the first spindle 3a is pushed by the axially moving second spindle 3b upon the friction-welding.

In the machine tool 1 according to the present embodiment, since the torque applied to the first drive source 9a is detected based on the current value as detected by the ammeter 12, and the control unit C controls the operation of the first drive source 9a to resist the torque applied to the first drive source 9a, it is possible to construct a control system for maintaining the first spindle 3a in a stationary state with a simple configuration. Thereby, it is possible to reduce the cost of the machine tool 1.

As illustrated in FIG. 2C, when the first workpiece W1 and the second workpiece W2 are friction-welded, the first workpiece W1 and the second workpiece W2 are integrated into a joined workpiece W3. There is generated a burr B on the outer peripheral surface of the joint portion of the joined workpiece W3, as the portion softened by the frictional heat of the first workpiece W1 and the second workpiece W2 is extruded radially outward during the friction-welding.

Figure 3:
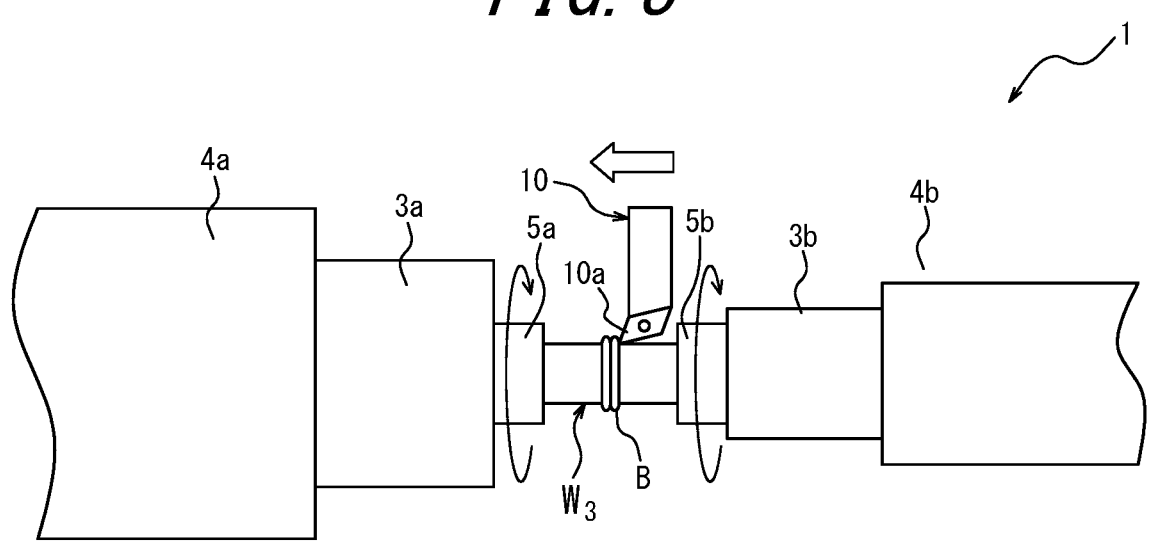
FIG. 3 is an explanatory view illustrating the state wherein a cutting process is carried out for removing burrs from the outer peripheral surface of the friction-welded workpieces.

In the machine tool 1 according to the present embodiment, after the first workpiece W1 and the second workpiece W2 have been need to each other, the control unit C may integrally control the rotation of the first spindle 3a and the second spindle 3b and the movement of the tool 10, so that the tool 10 is moved in the cutting direction and the feeding direction by the moving means 11 while rotating the first spindle 3a and the second spindle 3b in the same direction at the same rotation speed, thereby carrying out a cutting process for cutting the joined workpiece W3, as illustrated in FIG. 3. By this, the blade portion 10a of the tool 10 can be pressed against the burr B of the joined workpiece W3 to remove the burr B from the joined workpiece W3, without attaching and detaching the joined workpiece W3 to and from the first spindle 3a and the second spindle 3b. Thus, the machining can be carried out continuously after the friction-welding, making it possible to reduce the machining time.

When the cutting process is continuously performed subsequently to the friction-welding, after the first workpiece W1 and the second workpiece W2 have been heated by frictional heat, it is preferred to ensure that, instead of stopping rotation of both first spindle 3a and second spindle 3b, the rotation of the second spindle 3b is started for rotating the first spindle 3a and the second spindle 3b in the same direction at the same predetermined rotation speed, so as to stop the relative rotation of the first workpiece W1 and the second workpiece W2 while pressing the second workpiece W2 against the first workpiece W1 in that state, to carry out the friction-welding. In this case, the predetermined rotation speed of the first spindle 3a and the second spindle 3b in friction-welding is set to a rotation speed suitable for the cutting process by means of the tool 10. According to this configuration, after the friction-welding, the cutting process can be carried out without stopping the rotation of the first spindle 3a and the second spindle 3b, while rotating the first spindle 3a and the second spindle 3b w at the predetermined rotational speed in the friction-welding. Thus, since the cutting process can be carried out after the pressure welding, without stopping the rotation of the first spindle 3a and the second spindle 3b or adjusting the rotation speed, while maintaining the rotation of the first spindle 3a and the second spindle 3b at the predetermined rotation speed, it is possible to further reduce the processing time.

It goes without saying that the present disclosure is not limited to the embodiments described above, and various modifications may be made without departing from the scope of the present disclosure.

In the above-mentioned embodiment, the torque applied to the first drive source 9a is detected based on the current value detected by the ammeter 12, and the control unit C controls the operation of the first drive source 9a so as to resist the torque. However, the configuration may be changed in various manner, provided that the operation of the first drive source 9a can be controlled so as to maintain the axial position of the first spindle 3a. Thus, for example, the operation of the first drive source 9a may be controlled by means of the control unit C, by detecting the pressing force applied by the second spindle 3b to the first spindle 3a and resisting that pressing force.

In the present embodiment, the machine tool 1 has a configuration in which the first spindle 3a is larger in diameter than the second spindle 3b and heavier in weight that the second spindle 3b, though the first spindle 3a and the second spindle 3b may be of the same diameter and the same weight. Further, the inertia of the members driven by the first drive source 9a and moving in the axial direction together with the first spindle 3a, as a whole, may be same as, or smaller than the inertia of the members driven by the second drive source 9b and moving in the axial direction together with the second spindle 3b, as a whole. In these cases, the pressing force applied from the second spindle 3b to the first spindle 3a becomes relatively large, though the control unit C may control the operation of the first drive source 9a so as to cause the first spindle 3a to generate a large reaction force against the large pressing force, thereby maintaining the first spindle 3a stationary to ensure that the first workpiece W1 and the second workpiece W2 can be smoothly subjected to friction-welding.

In the present embodiment, the motors for rotating the first spindle 3a and the second spindle 3b have been described as electric motors for transmitting rotational driving force from the outside of each spindle. However, they may be configured as built-in motors that are installed inside the first headstock 4a and the second headstock 4b to rotate the first spindle 3a and the second spindle 3b.

In the present embodiment, as illustrated in FIGS. 2A to 2C, the first workpiece W1 held by the first spindle 3a is rotated by the first electric motor 6a first of all, and the second drive source 9b is then operated to move the second spindle 3b in the axial direction toward the first spindle 3a and bring the axial end face of the first workpiece W1 into contact with the axial end face of the second workpiece W2, as illustrated in FIG. 2B. However, the configuration may be modified such that the second drive source 9b is operated first of all to move the second spindle 3b in the axial direction toward the first spindle 3a and bring the axial end face of the first workpiece W1 into contact with the axial end face of the second workpiece W2, as illustrated in FIG. 2B, and then the first workpiece W1 held by the first spindle 3a is rotated by the first electric motor 6a to carry out the friction-heating.

In the present embodiment, the control unit C is configured to control the operation of the first drive source 9a so as to hold the axial position of the first spindle 3a when, as illustrated in FIG. 2B, the axial end surface of the second workpiece W2 is brought into contact with the axial end surface of the first workpiece W1 (the former), and also when, as illustrated in FIG. 2C, after the first workpiece W1 and the second workpiece W2 have been frictionally heated, the axial end surface of the second workpiece W2 is pressed in the axial direction against the axial end surface of the first workpiece W1 with a predetermined pressure (the latter). However, the control unit C may be configured to control the operation of the first drive source 9a so as to hold the axial position of the first spindle 3a only in the latter case, where a larger pressing force is applied from the second spindle 3b to the first spindle 3a.

In the present embodiment, in a state where the first spindle W1 held by the first spindle 3a and the second workpiece W2 held by the second spindle 3b are rotated relative to each other with a predetermined rotation speed difference, and only the second spindle 3b is moved in the axial direction toward the first spindle 3a while keeping the first spindle 3a stationary without moving in the axial direction, the axial end face of the first workpiece W1 and the second workpiece W2 are brought into contact with each other for frictional heating. However, the configuration may be modified such that, by moving both the first workpiece W1 held by the first spindle 3a and the second workpiece W2 held by the second spindle 3b in the axial direction toward each other, in a state of being relatively rotated with the predetermined rotation speed difference, the axial end face of the first workpiece W1 and the axial end faces of the second workpiece W2 are brought into contact with each other for frictional heating.

Further, in the present embodiment, after stopping the rotation of the first spindle 3a to stop the relative rotation between the first workpiece W1 and the second workpiece W2, while the first spindle 3a is maintained stationary without being moved in the axial direction, only the second spindle 3b is moved further in the axial direction toward the side of the first spindle 3a, to press the axial end face of the second workpiece W2 in the direction along the axial direction against the axial end face of the first workpiece W1 at a predetermined pressure (upset pressure). However, the configuration may be modified such that both the first main shaft 3a and the second main shaft 3b are moved in the axial direction by a certain distance so as to approach each other, for pressing the axial end face of the second workpiece W2 against the axial end face of the first workpiece W1 to some extent, and then the movement of the first main shaft 3a is stopped to maintain it stationary while only the second main shaft 3b is further moved toward the first main shaft 3a, thereby pressing the axial end surface of the second workpiece W2 in the axial direction against the axial end surface of the first workpiece W1 at a predetermined pressure (upset pressure).

In the present embodiment, the cutting process for removing the burr B from the joined workpiece W3 has been described by moving the tool 10 so that the blade portion 10a of the tool 10 is pressed against the burr B of the joined workpiece W3. However, the configuration may be modified such that, under the control by means of the control unit C, the main shafts 3a and 3b are rotated in the same direction at the same rotation speed while holding the joined workpiece W3, and the respective main shafts 3a and 3b are moved synchronously in the axial direction for removing the burr B without moving the tool 10.

The first spindle 3a and the second spindle 3b may be arranged coaxially with each other at the time of friction-welding. In this case, they may be configured to be movable in the horizontal direction perpendicular to the axial direction (Z-axis direction).

REFERENCE SIGNS LIST

1: Machine tool
2: Base
3a: First spindle
3b: Second spindle
4a: First headstock
4b: Second headstock
5a: First clamp
5b: Second clamp
6a: First electric motor
6b: Second electric motor
7a: First guide rail
7b: Second guide rail
8a: First saddle
8b: Second saddle
9a: First drive source
9b: Second drive source
10: Cutting tool
10a: Blade
11: Moving means
12: Ammeter
W1: First workpiece
W2: Second workpiece
W3: Joined workpiece
C: Control unit (control means, torque detection means)
B: Burr

The invention claimed is:

1. A machine tool comprising:
a first spindle for holding a workpiece;
a first drive source for moving the first spindle in an axial direction;
a second spindle for holding a workpiece;
a second drive source for moving the second spindle in the axial direction; and
a control means for controlling the rotation of the first spindle, the rotation of the second spindle and the operation of the second drive source, so as to bring the workpiece held by the first main shaft and the workpiece held by the second main shaft into contact with each other while rotating them relative to each other, thereby to carry out the friction-heating, and to stop the relative rotation of the pair of workpieces and move only the second main shaft in the axial direction while holding the first main shaft stationary, thereby to carry out friction-welding of the pair of workpieces, characterized in that:
the control means is adapted to control the operation of the first drive source so as to maintain the axial position of the first spindle upon friction-welding of the pair of the workpieces, and
wherein the first drive source is an electric motor, and the machine tool further comprises torque detecting means for detecting the torque applied to the first drive source, and wherein the control means is adapted to control the operation of the first drive source upon the friction-welding of the pair of workpieces, so as to resist the torque detected by the torque detecting means.

2. The machine tool according to claim 1, wherein the inertia of a member, driven by the first drive source and moving in the axial direction together with the first spindle, as a whole, is larger than the inertia of a member driven by the second drive source and moving in the axial direction together with the second spindle, as a whole.

3. The machine tool according to claim 1, wherein the machine tool comprises a tool that can be moved under the control by the control means, and the control means is adapted to control the rotation of the first spindle, the rotation of the second spindle and the relative movement of the tool so that, after the pair of workpieces have been friction-welded, the first spindle and the second spindle are rotated in the same direction at the same rotation speed, while the tool is moved relative to the workpieces, thereby to carry a out cutting process for cutting the workpiece by means of the tool.

4. The machine tool according to claim 1, wherein the control means is adapted to control the operation of the second drive source so that, after stopping the relative rotation of the pair of the workpieces and while maintaining the first spindle stationary, only the second spindle is moved to an axial position predetermined in consideration of an upset distance.

5. The machine tool according to claim 2, wherein the machine tool comprises a tool that can be moved under the control by the control means, and the control means is adapted to control the rotation of the first spindle, the rotation of the second spindle and the relative movement of the tool so that, after the pair of workpieces have been friction-welded, the first spindle and the second spindle are rotated in the same direction at the same rotation speed, while the tool is moved relative to the workpieces, thereby to carry out a cutting process for cutting the workpiece by means of the tool.

6. The machine tool according to claim 2, wherein the control means is adapted to control the operation of the second drive source so that, after stopping the relative rotation of the pair of the workpieces and while maintaining the first spindle stationary, only the second spindle is moved to an axial position predetermined in consideration of an upset distance.

7. The machine tool according to claim 3, wherein the control means is adapted to control the operation of the second drive source so that, after stopping the relative rotation of the pair of the workpieces and while maintaining the first spindle stationary, only the second spindle is moved to an axial position predetermined in consideration of an upset distance.

* * * * *